(12) United States Patent
Hsieh et al.

(10) Patent No.: US 12,380,092 B1
(45) Date of Patent: *Aug. 5, 2025

(54) ENSURING GLOBALLY CONSISTENT TRANSACTIONS

(71) Applicant: Google LLC, Mountain View, CA (US)

(72) Inventors: Wilson Cheng-Yi Hsieh, Syosset, NY (US); Alexander Lloyd, New York, NY (US); Peter Hochschild, New York, NY (US); Michael James Boyer Epstein, Brooklyn, NY (US); Sean Quinlan, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,995

(22) Filed: Aug. 23, 2023

Related U.S. Application Data

(63) Continuation of application No. 17/875,780, filed on Jul. 28, 2022, now Pat. No. 11,789,938, which is a continuation of application No. 16/023,326, filed on Jun. 29, 2018, now Pat. No. 11,442,925, which is a continuation of application No. 15/358,428, filed on Nov. 22, 2016, now Pat. No. 10,042,881, which is a
(Continued)

(51) Int. Cl.
*G06F 16/23* (2019.01)
*G06F 9/46* (2006.01)
*G06F 16/14* (2019.01)
*G06F 16/2458* (2019.01)

(52) U.S. Cl.
CPC ......... *G06F 16/2379* (2019.01); *G06F 9/466* (2013.01); *G06F 16/148* (2019.01); *G06F 16/2322* (2019.01); *G06F 16/2477* (2019.01)

(58) Field of Classification Search
None
See application file for complete search history.

(56) References Cited

U.S. PATENT DOCUMENTS

| 5,504,899 | A | | 4/1996 | Raz |
| 6,052,363 | A | * | 4/2000 | Koch ..................... G06F 9/542 370/252 |

(Continued)

OTHER PUBLICATIONS

Alexander Thomson and Daniel J. Abadi, The Case for Determinism in Database Systems, 2010, 11 pages.

*Primary Examiner* — Taelor Kim
(74) *Attorney, Agent, or Firm* — Lerner David LLP

(57) ABSTRACT

The present technology proposes techniques for ensuring globally consistent transactions. This technology may allow distributed systems to ensure the causal order of read and write transactions across different partitions of a distributed database. By assigning causally generated timestamps to the transactions based on one or more globally coherent time services, the timestamps can be used to preserve and represent the causal order of the transactions in the distributed system. In this regard, certain transactions may wait for a period of time after choosing a timestamp in order to delay the start of any second transaction that might depend on it. The wait may ensure that the effects of the first transaction are not made visible until its timestamp is guaranteed to be in the past. This may ensure that a consistent snapshot of the distributed database can be determined for any past timestamp.

20 Claims, 7 Drawing Sheets

Related U.S. Application Data continuation of application No. 13/905,637, filed on May 30, 2013, now Pat. No. 9,569,253.

(60) Provisional application No. 61/655,386, filed on Jun. 4, 2012.

(56) References Cited

U.S. PATENT DOCUMENTS

| | | |
|---|---|---|
| 6,581,110 B1 | 6/2003 | Harif et al. |
| 7,362,767 B2 | 4/2008 | Orberk et al. |
| 8,938,636 B1 | 1/2015 | Hochschild et al. |
| 9,203,600 B1 | 12/2015 | Hochschild et al. |
| 9,915,970 B1 | 3/2018 | Hochschild et al. |
| 10,775,837 B1 | 9/2020 | Hochschild et al. |
| 11,353,917 B1 | 6/2022 | Hochschild et al. |
| 11,442,925 B1 | 9/2022 | Hsieh |
| 2002/0036984 A1 | 3/2002 | Chiussi et al. |
| 2005/0210153 A1 | 9/2005 | Rich et al. |
| 2005/0210306 A1 | 9/2005 | Rich et al. |
| 2007/0047591 A1 | 3/2007 | Senthilnathan et al. |
| 2007/0239356 A1 | 10/2007 | Woz |
| 2008/0175275 A1 | 7/2008 | Garner |
| 2008/0244094 A1 | 10/2008 | Rich et al. |
| 2008/0313496 A1* | 12/2008 | Prabhakaran ....... G06F 11/1438 714/E11.015 |
| 2009/0012932 A1 | 1/2009 | Romem et al. |
| 2009/0022089 A1 | 1/2009 | Rudrapatna |
| 2009/0089078 A1 | 4/2009 | Bursey |
| 2009/0310593 A1 | 12/2009 | Sheynblat et al. |
| 2010/0082772 A1 | 4/2010 | Suzuki |
| 2010/0185781 A1 | 7/2010 | Anderson |
| 2011/0023044 A1 | 1/2011 | Krutyolkin et al. |
| 2012/0102006 A1* | 4/2012 | Larson .................. G06F 16/27 707/703 |
| 2012/0275333 A1 | 11/2012 | Cociglio |
| 2013/0034197 A1 | 2/2013 | Aweya et al. |
| 2014/0006458 A1 | 1/2014 | Hsieh et al. |
| 2015/0127978 A1 | 5/2015 | Cui et al. |

* cited by examiner

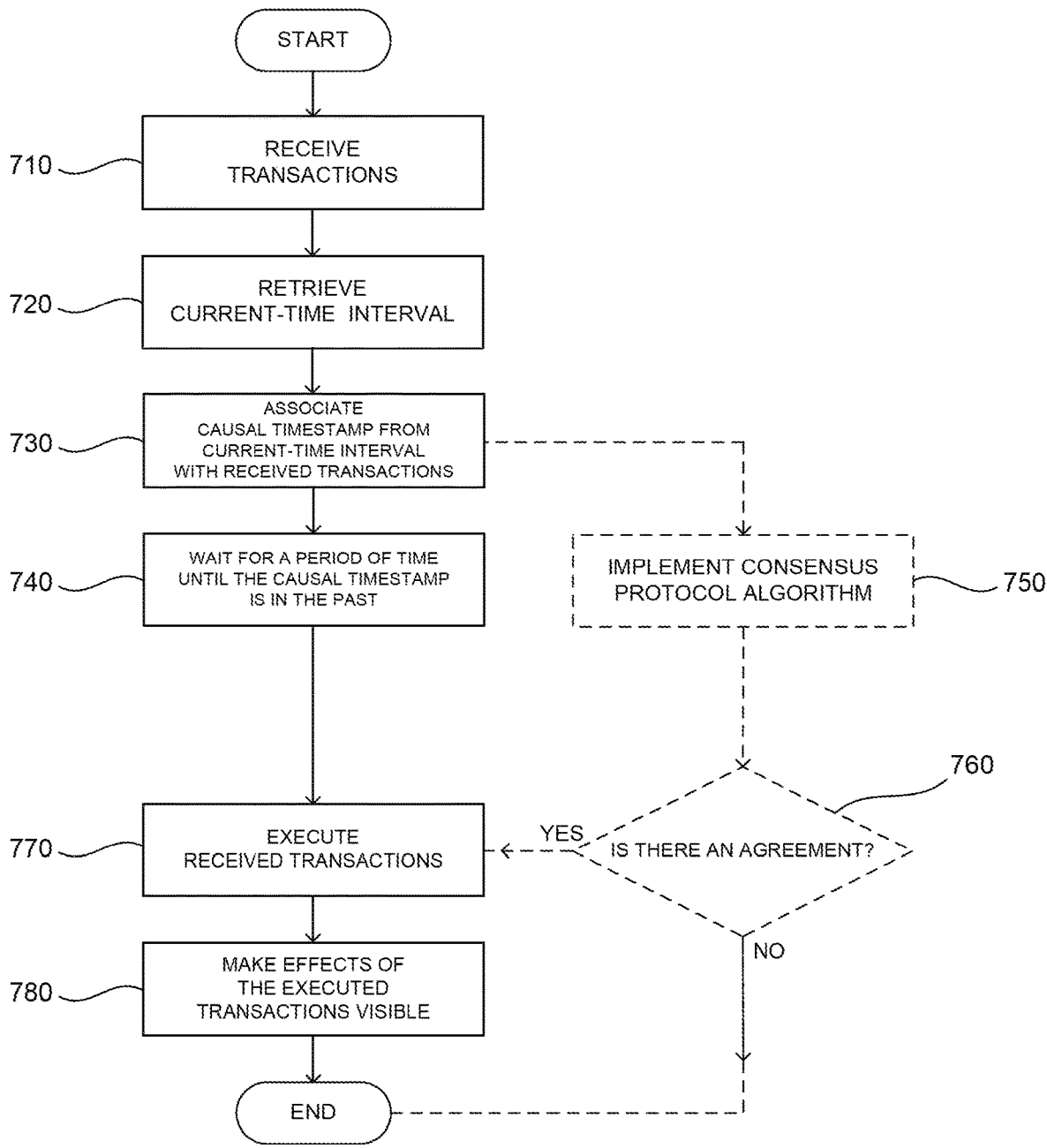

ENSURING GLOBALLY CONSISTENT TRANSACTIONS

CROSS-REFERENCE TO RELATED APPLICATIONS

The present application is a continuation of U.S. patent application Ser. No. 17/875,780, filed Jul. 28, 2022, which is a continuation of U.S. patent application Ser. No. 16/023,326, filed Jun. 29, 2018, now U.S. Pat. No. 11,442,925, which is a continuation of U.S. patent application Ser. No. 15/358,428, filed Nov. 22, 2016, now U.S. Pat. No. 10,042,881, which is a continuation of U.S. patent application Ser. No. 13/905,637, filed May 30, 2013, now U.S. Pat. No. 9,569,253, which claims the benefit of the filing date of U.S. Provisional Patent Application No. 61/655,386, filed Jun. 4, 2012, the disclosures of which are hereby incorporated herein by reference.

BACKGROUND

In a distributed database, one way of improving performance is by horizontally partitioning database tables into smaller components. For example, by distributing selected rows from the database tables across multiple database servers, the number of rows in each partition may be reduced. This may decrease the size of database indexes, which may improve search performance. Each horizontal partition can form part of a "shard" that in turn can be housed on different host machines located in one or more geographic locations. Typically, a client can access and update a current state of the shards by requesting a series of read/write transactions. However, causal inconsistencies in executing the transactions can occur.

BRIEF SUMMARY

Aspects of this disclosure may be advantageous for ensuring globally consistent transactions. This technology may be useful in providing externally consistent reads and writes across different partitions of a distributed database system. By introducing techniques to ensure causal consistency of transactions across the different partitions, a consistent snapshot of the distributed database may be determined for any past time.

One aspect of the disclosure provides a method that includes identifying a set of transaction events, receiving a first time interval from at least one globally coherent time service, determining, using a processor, a causal timestamp based on the first time interval and associating the causal timestamp with the set of transaction events. Accordingly, each transaction event may include a selected transaction and an action associated with the selected transaction. In addition, the method includes waiting a period of time for a given transaction event, causing a result specified by the action of the given transaction event and publishing the result.

In one example, the method may also include identifying a second set of transaction event, receiving a second time interval from at least one globally coherent time service, determining, using the processor, a second causal timestamp based on the second time interval, associating the second causal timestamp with the second set of transaction events. The second time interval may be after the first time interval, and each transaction event may include a selected transaction and an action associated with the selected transaction. In this example, the method may also include waiting a period of time for a given transaction event, causing a result specified by the action of the given transaction event and publishing the result. In another example, the method may include assuming that there is a causal dependency of the second set of transaction events on the first set of transaction events. In yet another example, while waiting for a period of time, the method may include determining whether the causal timestamp associated with the given transaction event is in the past. In addition, the method may include simultaneously executing a consensus protocol to determine whether the given transaction event can occur.

Another aspect of the disclosure provides a system that includes a memory and a processor coupled to the memory. The processor may be configured to identify a set of transaction events, receive a first time interval from at least one globally coherent time service, determine a causal timestamp based on the first current-time interval and associate the causal timestamp with the set of transaction events. Accordingly, each transaction event may include a selected transaction and an action associated with the selected transaction. In addition, the processor may be configured to wait a period of time for a given transaction event, cause a result specified by the action of a given transaction event and publish the result.

Yet another aspect of the disclosure provides a tangible, computer-readable storage medium that includes instructions that, when executed by a processor, cause the processor to perform a method. The method includes identifying a set of transaction events, receiving a first time interval from at least one globally coherent time service, determining, using a processor, a causal timestamp based on the first time interval and associating the causal timestamp with the set of transaction events. Accordingly, each transaction event may include a selected transaction and an action associated with the selected transaction. In addition, the method includes waiting a period of time for a given transaction event, causing a result specified by the action of the given transaction event and publishing the result.

BRIEF DESCRIPTION OF THE DRAWINGS

FIG. 7 is a flow diagram illustrating an example of a method for time stamping transactions in accordance with an aspect of the present technology.

DETAILED DESCRIPTION

Aspects, features and advantages of this disclosure will be appreciated when considered with reference to the following description of embodiments and accompanying figures. It should be noted that the same reference numbers in different drawings may identify the same or similar elements. Furthermore, the following description is not limiting; the scope of the present technology is defined by the appended claims and equivalents.

In this disclosure, systems and methods are provided for ensuring globally consistent transactions (e.g., read/write database transactions) in a distributed system. By introducing techniques to assign causal timestamps to each transaction, this technology may ensure that the causal order of timestamps reflect the dependency order of the database transactions. For example, in a distributed database that has been sharded into at least two database partitions P1 and P2, if a first transaction records an advertisement in data records of P1, and a second transaction records an impression of that advertisement in data records of P2, the techniques described herein may ensure that the timestamp recorded with the second transaction will be greater than the timestamp recorded with the first transaction. Moreover, any snapshot database read that spans over partitions P1 and P2 will observe the effects of the first transaction if it observes the second. In some aspects, the first transaction may wait for a period of time after choosing its timestamp in order to delay the start of any second transaction that might depend on it. The wait may ensure that the effects of the first transaction are not visible until its timestamp is guaranteed to be in the past.

According to aspects, causal relationships in the transactions can be preserved and represented by assigning each transaction with a globally coherent timestamp generated from a reliable distributed time service. This may ensure that a single timestamp can identify a snapshot of the transaction history. A reliable distributed time service can be implemented in several ways. As one example, a world-wide optical network service that regularly "ticks" for a set time interval (e.g., every millisecond) and updates a local counter at each tick may be used. The timestamps based on this service may be globally consistent within a constant uncertainty (e.g., one millisecond) about the exact current time. As a second example of a reliable distributed time service, a number of time masters can be deployed throughout the distributed system to serve as a globally synchronized time service. This is further described below with respects to FIGS. 1-4.

Figure 1:
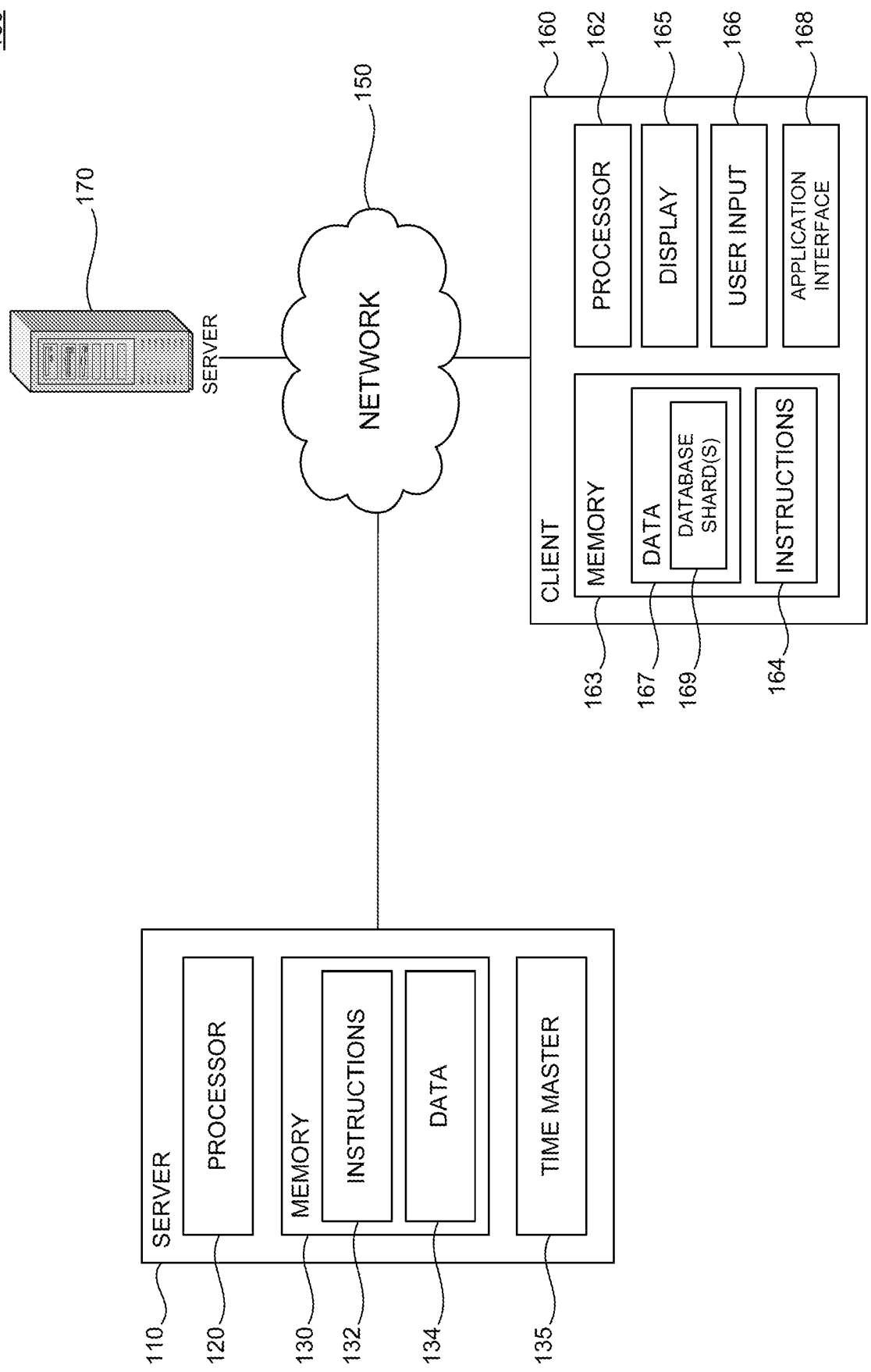
FIG. 1 is a diagram of a system in accordance with aspects of the present technology.

FIG. 1 is a diagram of a system 100, which describes the second example of a reliable distributed time service. As shown, an example of system 100 may include a number of servers 110 and 170 coupled to a network 150. The system may also include a client 160 capable of wireless communication with the servers 110 and 170 over the network 150.

A server 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance. Functions, methods and routines of the instructions are explained in more detail below.

The data 134 can be retrieved, stored or modified by the processor 120 in accordance with the instructions 132. For instance, although the system and method is not limited by a particular data structure, the data 134 can be stored in computer registers, in a relational database as a table having a plurality of different fields and records, or XML documents. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data. For example, the data 134 can include time data that may be encoded based on the instructions 132 in a time format used to describe instants of time such as Coordinated Universal Time, Unix epoch and unambiguous International Atomic Time epoch.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

As shown in FIG. 1, servers 110 and 170 can also include a time master module 135. The time master module 135 may be operable in conjunction with a receiver for receiving time signals. Time masters 135 may serve as accurate time references in a distributed system for (1) synchronizing machines and devices and (2) validating and monitoring that synchronization. This can include serving a reference time to a core network of machines and their supporting infrastructure. For example, an incoming time query from a client 160 may receive a timestamp determined by the time master 135. The timestamps may be based on various types of systems known in the arts for providing an accurate and reliable time reference, such as a Global Positioning System(GPS).

According to aspects, servers 110 and 170 may consist of middleware software that can manage and integrate the time master module 135 with internal components of the servers 110 and 170. In one aspect, the middleware may consist of a set of services that allow multiple processes running from the time master module 135 to interact with the processor 120, memory 130, instructions 132 and data 134. In some aspects, it may be neither desirable nor possible to run other types of services on a host server 110 in conjunction with a time master module 135. For example, system conflicts can occur over ports assigned to other services severely impacting the time master's reliability.

Servers 110 and 170 may be at one node of network 150 and capable of directly and indirectly communicating with other nodes of the network 150. For example, the servers 110 and 170 can include a web server that may be capable of communicating with client device 160 via network 150 such that it uses the network 150 to transmit information to a client application. Servers 110 and 170 may also include a number of computers, e.g., a load balanced server farm, that exchange information with different nodes of the network 150 for the purpose of receiving, processing and transmitting data to client devices. In this instance, the client computers will typically still be at different nodes of the network 150 than the computers making up servers 110 and 170. Although only a few servers 110, 170 are depicted in FIG. 1, it should be appreciated that a typical system can include a large number of connected servers with each being at a different node of the network 150.

Each client 160 may be configured, similarly to servers 110 and 170, with a processor 162, memory 163, instructions 164, and data 167. Each client 160 may be a personal computer, intended for use by a person having all the internal components normally found in a personal computer such as a central processing unit (CPU), CD-ROM, hard drive, and a display device 138, for example, a monitor having a screen, a projector, a touch-screen, a small LCD screen, a television, or another device such as an electrical device that can be operable to display information processed by the processor 162, speakers, a modem and/or network interface device, user input 137, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, network computers lacking local storage capability, set top boxes for televisions, and other networked devices.

The client 160 may include an application interface module 168. The application interface module may be used to access a service made available by a server, such as servers 110 and 170. For example, the application interface module may include sub-routines, data structures, object classes and other type of software components used to allow servers and clients to communicate with each other. In one aspect, the application interface module 168 may be a software module operable in conjunction with several types of operating systems known in the arts. For example, the client 160 may be connected to a Structured Query Language (SQL) database server that may operate in conjunction with the application interface module 168 for saving and retrieving information data. Memory 163 coupled to a client 160 may store data 167 accessed by the application module 168. The data 167 can also be stored on a removable medium such as a disk, tape, SD Card or CD-ROM, which can be connected to client 160.

As shown in FIG. 1, the client 160 may also include one or more database shards 169. As previously, discussed, records of a database system may spread across shards in order to, for example, distribute database processing loads. The database shards 169 may reside in memory 163 of the host client 160. In some aspects, more than one shard can reside in the memory 163 of a single host client 160. The database shards 169 may include database software, such as a database application, and database records. The database records of a given shard may be a subset of the records of a complete database system.

Servers 110 and 170 and client 160 can be capable of direct and indirect communication such as over network 150. For example, using an Internet socket, a client 160 can connect to a service operating on remote servers 110 and 170 through an Internet protocol suite. Servers 110 and 170 can set up listening sockets that may accept an initiating connection for sending and receiving information.

The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the servers and clients are not limited to a particular manner of transmission of information. Yet further, although some functions may be indicated as taking place on a single server having a single processor, various aspects of the system and method may be implemented by a plurality of servers, for example, communicating information over network 150.

Figure 2:
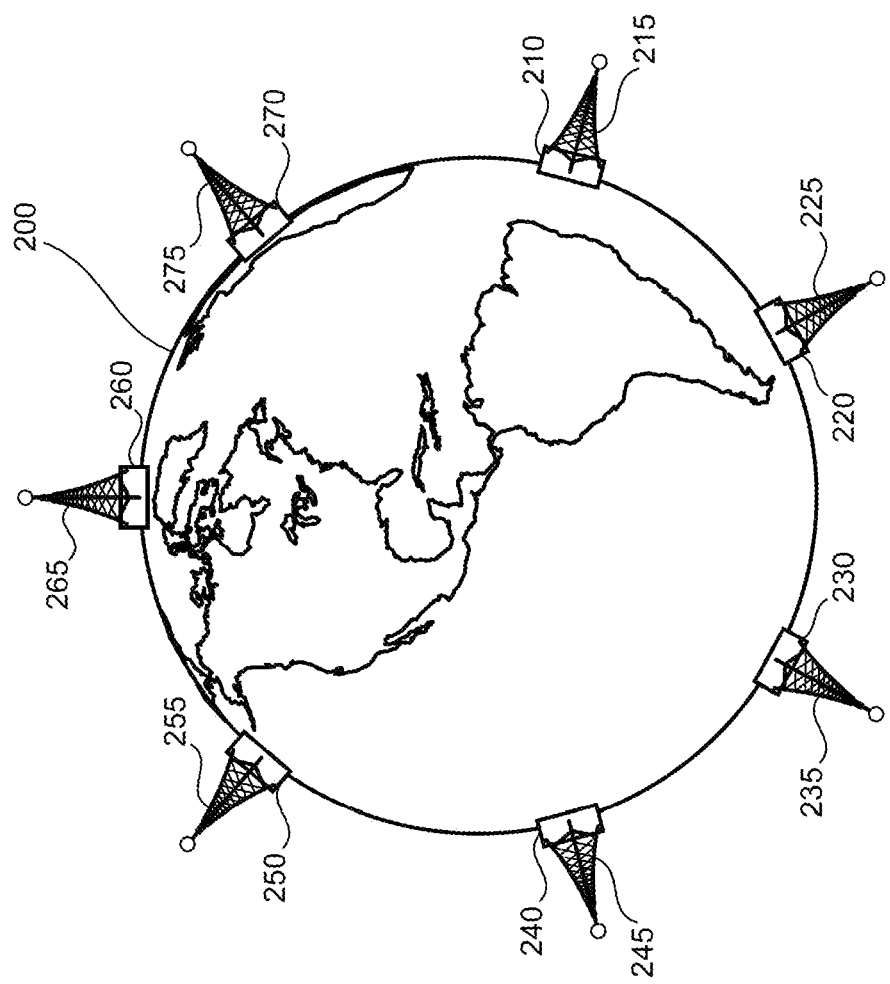
FIG. 2 is a geographical illustration of data centers positioned at various locations on earth in accordance with an aspect of the present technology.

FIG. 2 is a geographical illustration of data centers 210, 220, 230, 240, 250, 260 and 270 positioned at various locations on earth, as may be implemented in the second example of a reliable distributed time service. In this example, because of the world wide coverage of a robust global navigation satellite system (GNSS), it may be possible to deploy time masters in data centers 210, 220, 230, 240, 250, 260 and 270 around the world 200. Other existing time distribution systems may not come close to a GNSS system when measured based on reliability, accuracy, coverage and cost. In one aspect, all major data centers in a distributed system may be equipped with redundant time masters, which may provide a stable low-latency time reference to the data center. Redundant time masters may also provide fail-over capability, fault detection, localization and a means for cross checking time masters.

As previously discussed, each time master may be connected to a receiver such as a GPS receiver for receiving time signals. For resilience, it may be preferable to employ several varieties of GPS receivers, e.g., SPECTRACOM Model TSync-PCIe, SYMMETRICOM Model bc637PCI-V2 and MEINBERG. The GPS receivers may require roof-mounted antennas 215, 225, 235, 245, 255, 265 and 275, which may be located on the roof above data centers 210, 220, 230, 240, 250, 260 and 270. Host servers may be housed in server racks located in the data centers 210, 220, 230, 240, 250, 260 and 270. As such, conduits may be installed to route antenna cables from a host server to the roof top antennas. It may be possible to share one antenna across several receivers. This can be achieved, for example, with an antenna splitter. However, antenna sharing may be undesirable because of the low possibility of an antenna failure.

In addition to the components of the time masters described above and illustrated in the figures, various operations of the time masters will now be described. It should be understood that the following operations do not have to be performed in the precise order described below. Rather, various steps may be handled in a different order or simultaneously. Steps may also be added or omitted unless otherwise stated.

According to aspects, to ensure that the time masters are trustworthy, a subroutine, referred to herein as a time synchronization daemon, may be executed. Time synchronization daemons may be employed on one or a number of host machines simultaneously (e.g., client and time master host machines). By querying a fleet of time masters to determine a current timestamp, the time synchronization daemons may periodically compare the host machine's approximation of time against the fleet of time masters. Once the fleet of time masters has been queried for the current time, the time synchronization daemon may track the round-trip query delay associated with querying each time master. In some aspects, the time synchronization daemon can calculate synchronization offset intervals that may be relative to each time master (e.g., an interval between local time and a time master's representation of current time).

To detect and reject offset intervals derived from possibly malfunctioning time masters (e.g., time masters that have failed but are still producing timestamps), a voting method may be used, such as a variant of Marzullo's algorithm. As a result of the voting method, the time synchronization daemon may accept output from validated time masters or reject output from certain time masters, for example, malfunctioning time masters.

Figure 3:
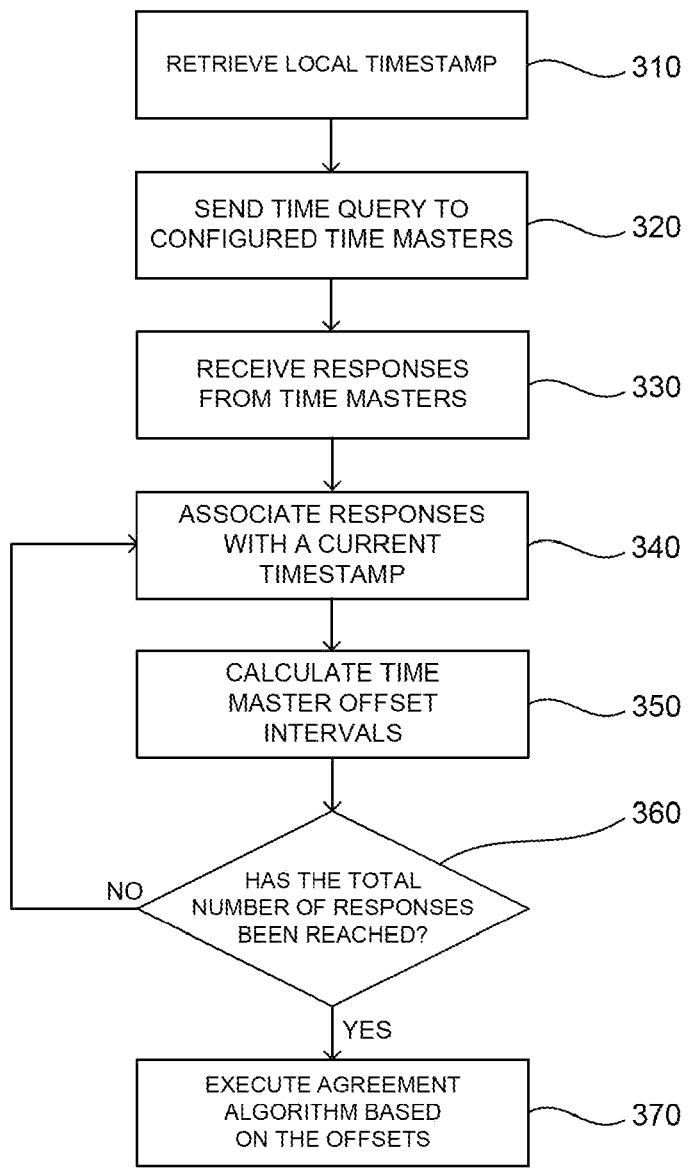
FIG. 3 is a flow diagram illustrating an example of a method for synchronizing a host machine to a set of time references in accordance with aspects of the present technology.

FIG. 3 is a flow diagram illustrating an example method 300 for synchronizing a host machine (e.g., GPS-fed and time masters or client host machine) to a set of time references, for example, as may be implemented in the second example of a reliable distributed time service. As previously discussed, time synchronization may involve time querying a configured subset of time masters and executing a voting algorithm on the query results to determine which time masters are producing accurate current timestamps.

In block 310, an initial local timestamp may be retrieved. For example, method 300 may access a registry for storing a host machine's approximation of a current date and time. This may reflect time from an internal time clock on the host machine. The timestamps can be encoded in various time formats used to describe instants of time such as Coordinated Universal Time (UTC), Unix epoch and the unambiguous International Atomic Time epoch (TAI).

In block 320, time queries may be sent to a pre-determined number of time masters (e.g., 5 to 10 time masters). For example, an application interface may be utilized to make a connection to a time master for sending and receiving information. In one aspect, the time masters may operate at Stratum 1 or Stratum 2. It is also possible for time masters to operate at any arbitrary number such as from [1 . . . K]. The basic definition of a Stratum-1 time master is that it may be directly linked (e.g., not over a network connection) to a reliable source of time such as a GPS receiver. A Stratum-2 time master may be connected to one or more Stratum-1 time masters over, for example, a network connection. In this example, a Stratum-2 time master may get its time via a network request to one or more Stratum-1 time master. In this regard, if a Stratum master is fed by a master operating at stratum K or less, it may be described as a Stratum-(K+1).

In block 330, responses may be received from the time masters queried in block 320. For example, as a result of the time request a time master may generate a timestamp. According to aspects, time masters may publish timestamps over a network connection in a distributed system. In one aspect, the application interface used to request a timestamp in block 420 may also be used to retrieve timestamp responses. Various other techniques for transmitting data over a network socket can be used to publish and receive timestamp responses, e.g., Transmission Control Protocol/Internet Protocol (TCP/IP), World Wide Web's Hypertext Transfer Protocol (HTTP), File Transfer Protocol (FTP), Telnet (Telnet) protocols and other types of communication protocols.

In block 340, a received time query response may be associated with a current local timestamp. For example, the current local timestamp may denote respective events of reception of the time query response according to a local time scale. In some aspects, the current local time may be stored with the associated time query response in memory or in a suitable computer readable medium capable of storing information accessible by a processor.

In block 350, a time offset interval may be calculated for each time master that was queried in block 320. The offset interval's width (e.g., a length of time duration) may represent transmission delays associated with a time request to and from a particular time master. The timestamps from each non-malfunctioning time master may correspond to an instant of time somewhere between the initial local timestamp taken in block 310 and the local timestamp associated with a time master's response in block 340.

A level of uncertainty (e.g., transmission delays) may also affect the time offset interval calculation. In this regard, to calculate the offset interval for each time master, the following equations may be used:

$$D(m)=T(m)-((L(m)+L(0))/2)$$

$$U(m)=(L(m)-L(0))/2$$

In the above equations, $D(m)$ represents the time offset relative to time master m, $T(m)$ represents the timestamp provided by master m, $U(m)$ represents an uncertainty related to a time master m, $L(m)$ represents the local time captured at the time when a time query response was received from time master m and $L(0)$ represents a local timestamp taken prior to dispatching the time queries to the time masters. Thus, with respect to a time master m, local time may be in error by an offset $D(m)$ plus or minus the uncertainty calculation $U(m)$ or in other words an interval range of $[D(m)-U(m)$ to $D(m)+U(m)]$.

In block 360, it may be continually tested whether the total number of time query responses has been reached. If the number has been reached, then method 300 may proceed to block 360. Otherwise, method 300 may repeat block 330 and receive another time query response.

In block 370, an agreement algorithm may be employed to analyze an aggregate of the time master offset intervals calculated in block 350. Because time masters may occasionally fail, an agreement algorithm (e.g., Marzullo's algorithm) may determine a smallest time offset interval consistent among a selected group of time masters.

A group of local time offsets calculated in block 350 may be selected. The selection may be based on a corresponding time master's configuration such as whether a time master is operating at Stratum 1. Each calculated offset may represent the local clock error relative to a particular time master. A determination may be made by method 300 for a maximal set of intersecting local time offsets from the group. In one example, if no two offset intervals intersect method 400 may stop. Method 300 may also stop if more offsets in the group disagree than agree. If at least two offset intervals intersect then an agreement validated offset interval (e.g., a smallest interval containing all points lying in the intersection of at least k-1 of the k intervals in the group) may be assigned for the group.

In one aspect, a level of uncertainty may be reflected in a group of offsets in an interval (e.g., the width of the group from smallest to largest offset). This level of uncertainty may be relatively small because typically several time masters may be nearby. Thus, the agreement validated offset determined in block 370 should be relatively accurate plus or minus a level of group uncertainty.

Figure 4:
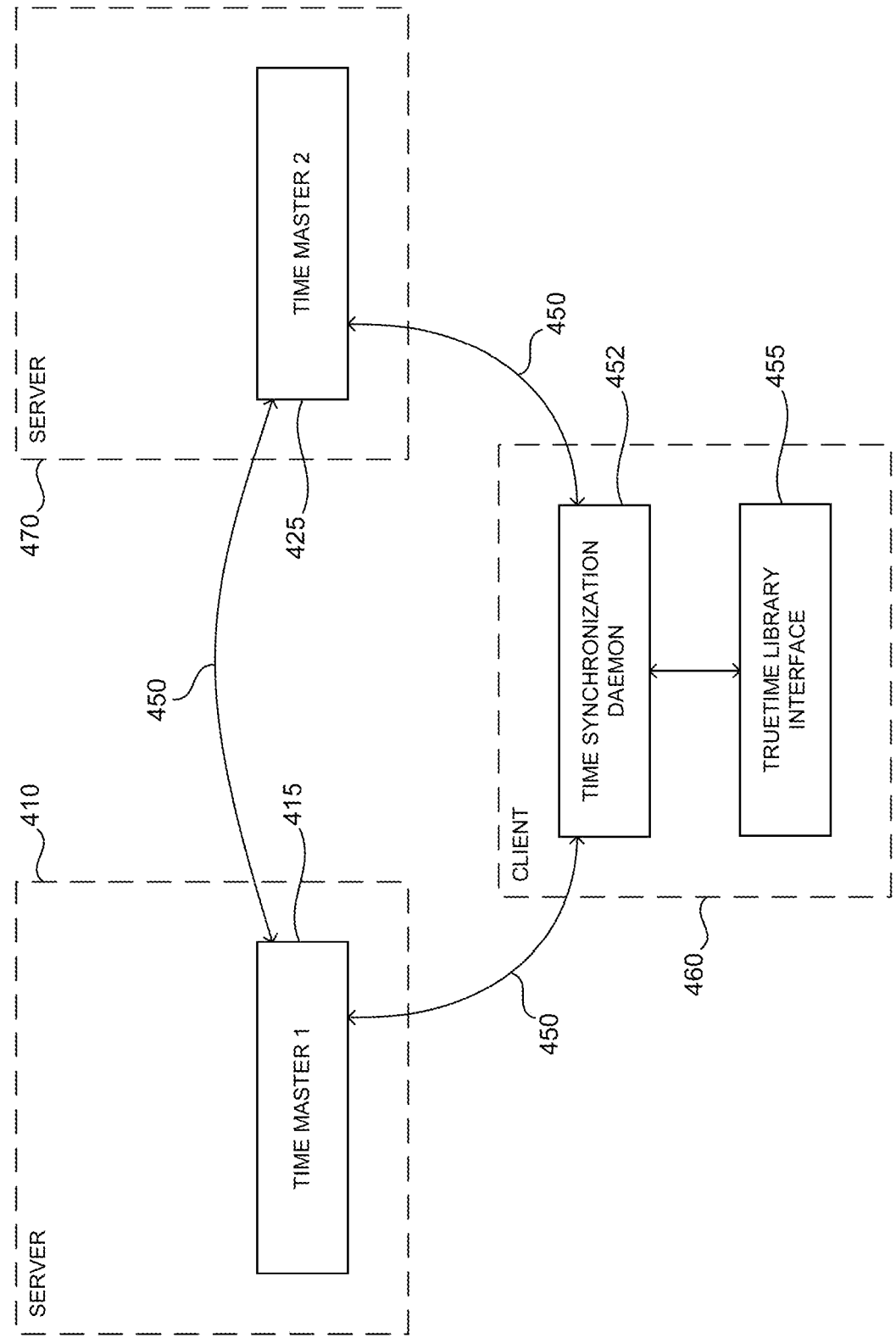
FIG. 4 is another diagram of a system in accordance with an aspect of the present technology.

FIG. 4 is another diagram of a system 400, which further describes the second example of a reliable distributed time service. As shown, system 400 may consist of at least three major modules: time masters 415 and 425 that may serve as a reliable time reference, a time synchronization daemon 452 that may synchronize local time by periodically querying multiple time masters and a library interface 455 for providing to applications a current-time interval that contains the current true time. The three modules may be capable of direct and indirect communication over, e.g., a network connection 450. Each module may consist of middleware software that may manage and integrate the modules with host machines 410, 460 and 470 such as the servers and client described with respects to FIG. 1.

According to aspects, time masters 415 and 425 may serve as primary time references in a distributed system. As previously discussed, the time masters' internal clocks may be synchronized with, e.g., a GPS signal, atomic clock or other types of accurate timekeeping technologies known in the arts. The time masters may be designed for high reliability and may be deployed at multiple sites throughout a distributed system. Although only two time masters are depicted in FIG. 4, it should be appreciated that a typical system 400 can include a large number of time masters communicating with each other, for example, over a network connection 450.

The time synchronization daemon 452 may periodically query multiple time masters 415 and 425 for a current timestamp. The daemons may calculate synchronization offset intervals relative to each time master 415 and 425 by tracking round-trip delays related to a time query. Sets of time master offsets may be validated against each other using, e.g., clock-synchronizing techniques as described with respects to FIG. 3. As previously discussed the clock synchronizing techniques may employ an agreement algorithm to detect and reject offsets from malfunctioning time masters.

A library interface 455 may be employed to transmit validated current-time intervals to client applications. For example, a client may use an application programming interface (API) that may be operable in conjunction with the library in order to communicate with modules of system 400. The library may also calculate a local time offset interval (e.g., a difference between local time and a time reference) based on such factors as a local clock, known rate errors related to the local clock, and an offset interval determined by the time synchronization daemon 452 at the last time the time masters 415 and 425 were polled.

In some instances, it may be difficult to determine an order of events in a distributed system because system clocks are not always synchronized. However, event ordering can be determined using a current-time interval generated with the library rather than using a machine-local approximation of current time. In one aspect, the current-time interval can be used as a basis for making causally dependant information globally available to host machines in the distributed system. For example, this information can be used by an application associated with a distributed database to causally timestamp database transactions occurring across different geographic locations.

Figure 5:
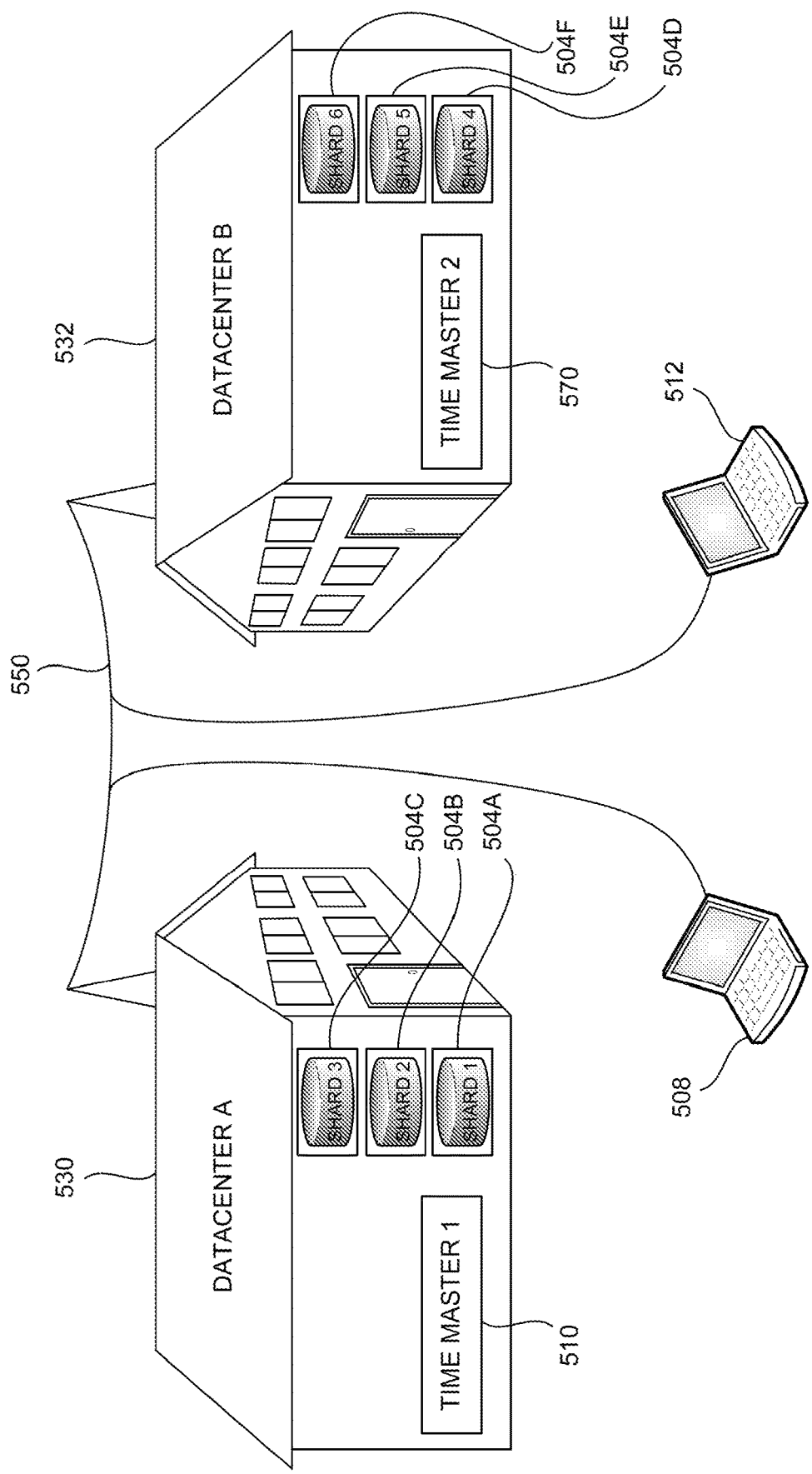
FIG. 5 is an example of a distributed database including two datacenters in accordance with an aspect of the present technology.

FIG. 5 is an example of a distributed database including two datacenters 530 and 532. In FIG. 5, portions (e.g., shards) of a complete database are shown stored on multiple computers within two datacenters 530 and 532. According to aspects, the complete database can contain an unlimited number of tables, with rows, columns and fields. The fields can store multiple pieces of data, each associated with a different timestamp. In one aspect, the timestamp may be based on current time information provided by a locally accessible time master 510 and 570.

The datacenters 530 and 532 may be stationed at locations around the globe. For example, datacenter A may be in New York, while datacenter B may be in London. The datacenters 530 and 532 may communicate via a network connection 550, for example, in order to send and receive information between resident computers. As shown in FIG. 5, each datacenter may contain a number of database shards 1-6. The database shards may reside on host computers 504A-F having typical computer components, for example, a processor, memory, instructions, and data.

According to aspects, the database shards may include records that are a subset of records found in a complete database system. In this regard, computers 508 and 512 may communicate with the shards 1-6, using a network connection 550, to store records on and retrieve records from the shards 1-6. For example, a user may use computer 508 to access and send e-mail messages stored on one or more of the database shards 1-6. The shards 1-6 may include messages from the user's mailbox, which may be a subset of records making up a complete global e-mail system. Although only a few shards are shown in FIG. 5, it should be appreciated that a datacenter can have many host computers including a large number of shards.

Figure 6:
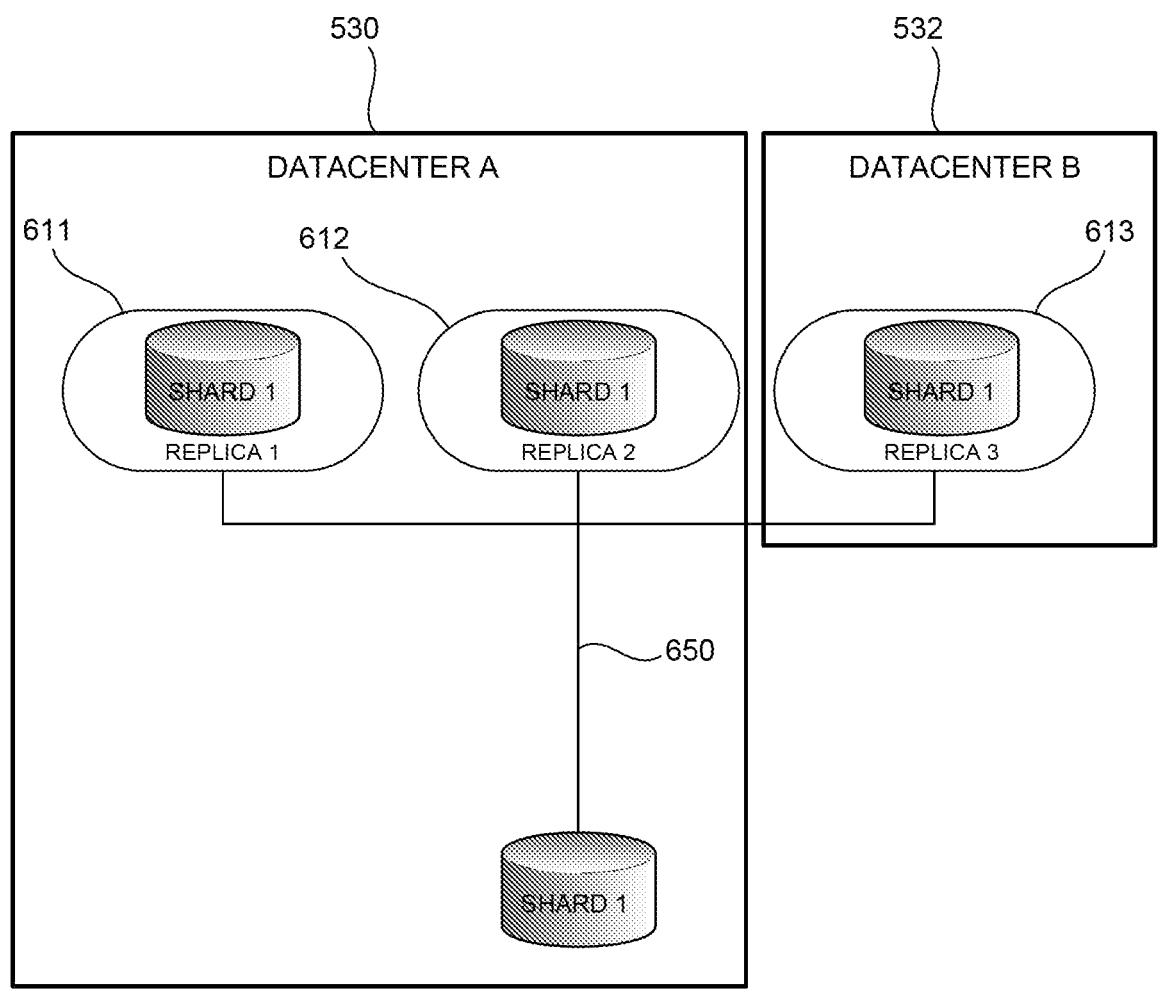
FIG. 6 is another example of the distributed database of FIG. 5 in accordance with an aspect of the present technology.

FIG. 6 is another example of the two data centers 530 and 532 of FIG. 5. In this example, three replicas 611, 612 and 613 of shard 1 are shown. Replication is a process of sharing information so as to ensure consistency between redundant resources. In that regard, each of the replicas 611, 612 and 613 may maintain a redundant copy of shard 1. According to aspects, replication may be used both for availability and geographic locality of access. For example, replicas 611 and 612 in datacenter A 530 may provide a redundant level of protection against system failures. While replica 613 may be remotely located in datacenter B 532 to provide local access to the information stored in shard 1. The replicas 611, 612 and 613 may cooperate, e.g., via a network connection 650, to maintain a consistent state of shard 1 in each replica.

According to aspects, one replica may take on a lead role for ordering transactions with the other replicas operating as listeners. For example, a replica in a lead role may be an organizer of some group of transactions to be distributed among several other replicas, which may execute the transactions on their local copy of shard 1. Some replicas may be ineligible to become a lead replica because of their capabilities, for example, they may be configured as read-only, or may not store a complete copy of a resource (e.g., shard 1). In some instances, the "Leader" replica may be elected, for example, by an agreement of a majority of the replicas. Before the transactions have begun, the replicas may be unaware of which will serve as the "Leader," or coordinator, of the transactions. The replicas may communicate with each other in order to decide which will get into a lead state.

In some aspects, a leader election algorithm may be employed in order to break any symmetry between competing "Leader" candidates. For example, replicas may examine their own health (e.g., latency to clients, file-system performance, etc.), and request health information for other eligible replicas. If a replica determines that it is relatively healthy as compared to the other replicas, it may send a message to the other replicas requesting the right to become "Leader." If it gets an affirmative response from a majority of the other replicas, then it begins a period of leadership, which may be extended via additional messages among the replicas. An elected "Leader" may also turn over leadership to another replica if it determines that another replica may do a better job as leader. For example, another replica's health information may be above a threshold value or above the current elected leader's health value.

According to aspects, the replicas 611, 612 and 613 may implement a consensus protocol, such as Paxos. A consensus protocol is a mechanism where the replicas 611, 612 and 613 can determine whether or not a proposed transaction may be accepted, as well as a mechanism for resolving conflicts between conflicting proposed transactions. For example, a 2-phase consensus protocol may include a first phase in which all replicas involved in the consensus protocol agree to a proposed transaction (or, if any replica disagrees, the proposed transition is denied). In the second phase, the replicas actually perform the transaction if the transaction has been accepted.

In a Paxos protocol implementation, any of the replicas 611, 612 and 613 may act as a leader and transmit a proposal transaction to a group of replicas operating as listeners. For example, the leader can determine which transactions to propose and may request a vote from the other replicas. Each replica, may vote for the proposed transaction. If a quorum of the replicas (e.g., over 50% of the replicas) agreed on the proposal, then the proposal may be accepted, and the leader can transmit a message to all of the replicas instructing that they execute the agreed upon transaction. The leader may also timestamp the transactions in a manner that preserves a consistent snapshot of the replicas 611, 612 and 613 at any past time. An example this time stamping technique is further described below with respects to FIG. 7.

FIG. 7 is a flow diagram illustrating an example of a method 700 for time stamping client transactions. By assigning causally generated timestamps to transactions, a causal relationship of the transaction can be preserved. In one aspect, the timestamps may be based on a number of synchronized time masters deployed throughout the distributed system, rather than on a local approximation of current time.

In block 710, a number of transactions may be received. The transactions may originate from one or more database clients that may employ an application interface (API) to transmit the transactions. For example, the API may allow clients to send a write transaction, which may include information to be stored in a database system. Alternatively, the clients may send via the API a read transaction with instructions to retrieve certain information stored in the database system.

In block 720, a current-time interval may be retrieved. According to aspects, for each transaction received in block 710, a current-time interval may be retrieved by employing an instance of a library interface. For example, method 700 may operate in conjunction with the library interface described with respects to FIG. 4. The library may provide a globally consistent representation of current time. As previously discussed, the library may determine the current-time interval based on an agreement between groups of time masters deployed throughout a distributed system. In this regard, the width of the current-time interval may represent a level of uncertainty about the exact current time.

In block 730, causal timestamps from the current-time interval may be associated with the received transactions. According to aspects, the latest timestamp in the time interval from block 720 may be selected and maintained in a predetermined format. For example, the timestamp can be encoded in a time format used to describe instants of time such as UTC. In one aspect, the timestamp may be associated with a set of undelivered transactions (e.g., transaction that have not been executed). For example, the timestamp may be stored with each received transaction in a memory buffer.

In block 740, method 700 may wait a period of time. The time period may be determined based on the causal timestamp associated with the transactions. For example, the wait time may be determined by calculating when the current-time interval has passed the causal timestamp. According to aspects, waiting in block 740 may preserve a causal order of the transactions by ensuring that the effects of the received transactions are not made visible to depended-upon successor transactions, until the causal timestamp associated with the received transactions is in the past. This may also ensure that causal successor transactions are assigned respectively larger timestamps.

To determine whether the current-time interval has passed, method 700 may, for example, periodically query the library interface until a new current-time interval is provided that is past the causal timestamp. When the new current-time interval is provided, method 700 may end its waiting period and proceed to block 770. It will be appreciated that in some aspects other types of computations can occur contemporaneously with block 740 while the waiting time period is passing. For example, method 700 may optionally proceed to block 750 in parallel with block 740 to determine whether the received transactions can be executed.

In block 750, a consensus protocol algorithm, such as Paxos, may be implemented. As previously discussed, a consensus protocol defines a mechanism to determine whether or not a proposed transaction is to be accepted, as well as a mechanism for resolving conflicts between conflicting proposed transactions. Based on the results of a Paxos consensus, the received transaction may be accepted for execution. For example, in a distributed database, an implementation of the Paxos consensus protocol may request votes from a set of database replicas on a proposed transaction. If quorum of the replicas agree on the proposed transaction, then it may be permitted otherwise it may be rejected.

In block 760, it may be determined whether there is an agreement on executing the received transactions. If there is an agreement, method 700 may proceed to block 770; otherwise it may end.

In block 770, the received transactions may be executed. If a write transaction is received, information may be written, for example, to a database replica. The information may include the timestamp associated with the transaction. If the received transaction is a read request, then the timestamp associated with the transaction may be used to retrieve stored information. For example, a time snapshot of data from a database replica may be retrieved.

In block 780, results of the executed transactions may be made visible. For example, a client device that sent the transactions may now see the results of the executed transactions. According to aspects, a completion of the received transactions may be acknowledged. For example, the causal timestamp associated with the transactions may be sent back to a client device. The information data affected by the transactions may be then published to successor transactions. For example, this information may represent a current state of a distributed database, which may be used as a basis for any future client transactions.

The above-described aspects of the technology may be advantageous for ensuring globally consistent transactions. This technology may be useful in many applications, e.g., for system replication, debugging, event monitoring and detecting global states in a distributed system, such as a distributed database that allows a single (logical) database to be physically distributed on different autonomous computers. For example, causal relationships in the transactions of a distributed database can be preserved by assigning each transaction with a globally coherent timestamp generated from a reliable distributed time service. By introducing techniques to ensure that the order of causal timestamps reflect the dependency order of the database transactions, the timestamps may provide a basis for determining a consistent snapshot of the distributed database for any past time.

As these and other variations and combinations of the features discussed above can be utilized without departing from the subject matter defined by the claims, the foregoing description of the examples should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible implementations. Further, the same reference numbers in different drawings may identify the same or similar elements.

The invention claimed is:

1. A distributed system having one or more processors and one or more storage devices, the distributed system comprising:
   one or more time masters;
   a time synchronization daemon in communication with the one or more time masters, the time synchronization daemon configured to synchronize local time by:
     periodically querying the one or more time masters;
     tracking round-trip delays associated with querying the one or more time masters, each round-trip delay indicating an amount of time between sending a query to one of the time masters and receiving a response to the query from the one of the time masters; and
     calculating a current-time interval based on the round-trip delays; and
   a library interface in communication with the one or more time masters and the time synchronization daemon, the library interface configured to provide applications with the current-time interval that contains a current true time for causally timestamping transactions occurring across different geographic locations.

2. The distributed system of claim 1, wherein the one or more time masters are deployed at multiple host machines.

3. The distributed system of claim 1, wherein the time synchronization daemon is further configured to calculate synchronization offset intervals relative to each of the one or more time masters based on tracking the round-trip delays.

4. The distributed system of claim 1, wherein the time synchronization daemon is further configured to:
   receive, from the one or more time masters, responses to periodic time queries, wherein the received responses include response timestamps generated by the one or more time masters;
   calculate, for each of the received responses, a time offset interval, wherein a length of time duration of the time offset interval represents a level of uncertainty associated with the query to and from a particular time master; and
   determine an agreement validated offset interval consistent among a selected group of the one or more time masters based on the calculated time offset intervals.

5. The distributed system of claim 4, wherein the time synchronization daemon is further configured to:
   identify the time masters outside of the selected group as producing inaccurate timestamps; and
   reject time offset intervals from the identified time masters.

6. The distributed system of claim 4, wherein the time synchronization daemon is further configured to:
   identify the time masters within the selected groups as producing accurate timestamps; and
   validate time offset intervals from the identified time masters.

7. The distributed system of claim 6, wherein the library interface is further configured to transmit the validated time offset intervals to the applications.

8. A method for synchronizing one or more time masters of a distributed system, the method comprising:
   synchronizing, by a time synchronization daemon, local time by:
     periodically querying the one or more time masters;
     tracking round-trip delays associated with querying the one or more time masters, each round-trip delay indicating an amount of time between sending a query to one of the time masters and receiving a response to the query from the one of the time masters; and
     calculating a current-time interval based on the round-trip delays; and
   providing, by a library interface, applications with the current-time interval that contains a current true time for causally timestamping transactions occurring across different geographic locations.

9. The method of claim 8, wherein the one or more time masters are deployed at multiple host machines.

10. The method of claim 8, further comprising calculating, by the time synchronization daemon, synchronization offset intervals relative to each of the one or more time masters based on tracking the round-trip delays.

11. The method of claim 8, further comprising:
    receiving, by the time synchronization daemon, from the one or more time masters, responses to periodic time queries, wherein the received responses include response timestamps generated by the one or more time masters;
    calculating, by the time synchronization daemon, for each of the received responses, a time offset interval, wherein a length of time duration of the time offset interval represents a level of uncertainty associated with the query to and from a particular time master; and
    determining, by the time synchronization daemon, an agreement validated offset interval consistent among a selected group of the one or more time masters based on the calculated time offset intervals.

12. The method of claim 11, further comprising:
    identifying, by the time synchronization daemon, the time masters outside of the selected group as producing inaccurate timestamps; and
    rejecting, by the time synchronization daemon, time offset intervals from the identified time masters.

13. The method of claim 11, further comprising:
- identifying, by the time synchronization daemon, the time masters within the selected groups as producing accurate timestamps; and
- validating, by the time synchronization daemon, time offset intervals from the identified time masters.

14. The method of claim 13, further comprising transmitting, by the library interface, the validated time offset intervals to the applications.

15. A non-transitory computer-readable medium storing instructions that, when executed by one or more processors, cause the one or more processors to perform a method for synchronizing one or more time masters of a distributed system, the method comprising:
- synchronizing, by a time synchronization daemon, local time by:
  - periodically querying the one or more time masters;
  - tracking round-trip delays associated with querying the one or more time masters, each round-trip delay indicating an amount of time between sending a query to one of the time masters and receiving a response to the query from the one of the time masters; and
  - calculating a current-time interval based on the round-trip delays; and
- providing, by a library interface, applications with the current-time interval that contains a current true time for causally timestamping transactions occurring across different geographic locations.

16. The non-transitory computer-readable medium of claim 15, wherein the method further comprises calculating, by the time synchronization daemon, synchronization offset intervals relative to each of the one or more time masters based on tracking the round-trip delays.

17. The non-transitory computer-readable medium of claim 15, wherein the method further comprises:
- receiving, by the time synchronization daemon, from the one or more time masters, responses to periodic time queries, wherein the received responses include response timestamps generated by the one or more time masters;
- calculating, by the time synchronization daemon, for each of the received responses, a time offset interval, wherein a length of time duration of the time offset interval represents a level of uncertainty associated with the query to and from a particular time master; and
- determining, by the time synchronization daemon, an agreement validated offset interval consistent among a selected group of the one or more time masters based on the calculated time offset intervals.

18. The non-transitory computer-readable medium of claim 17, wherein the method further comprises:
- identifying, by the time synchronization daemon, the time masters outside of the selected group as producing inaccurate timestamps; and
- rejecting, by the time synchronization daemon, time offset intervals from the identified time masters.

19. The non-transitory computer-readable medium of claim 17, wherein the method further comprises:
- identifying, by the time synchronization daemon, the time masters within the selected groups as producing accurate timestamps; and
- validating, by the time synchronization daemon, time offset intervals from the identified time masters.

20. The non-transitory computer-readable medium of claim 19, wherein the method further comprises transmitting, by the library interface, the validated time offset intervals to the applications.

\* \* \* \* \*